Feb. 6, 1968 W. P. DUGAN ET AL 3,367,754

ELECTRONIC TRANSMISSION MATERIAL AND METHOD OF FABRICATION

Filed Feb. 3, 1965

INVENTORS.
WILLIAM P. DUGAN,
ANDREW E. FLANDERS,
ROBERT F. ROBINS,
CLAUDE E. FEIGHNER, 3,367,754

ELECTRONIC TRANSMISSION MATERIAL AND METHOD OF FABRICATION

William P. Dugan, Monterey Park, Andrew E. Flanders and Robert F. Robins, Pomona, and Claude E. Feighner, Ontario, Calif., assignors to General Dynamics Corporation, Pomona, Calif., a corporation of Delaware Continuation-in-part of application Ser. No. 421,239, Dec. 28, 1964. This application Feb. 3, 1965, Ser. No. 430,089
18 Claims. (Cl. 29—199)

ABSTRACT OF THE DISCLOSURE

Briefly, the disclosure is directed to a conductive material suitable for surface welding applications and an electroplating method for fabricating the material. The conductive material in the as-plated condition is of a laminar construction, e.g. a base metal with at least one layer of different metals applied thereon. The base metal may be nickel, copper, silver, chromium, nickel-iron alloy such as Kovar, or any other metal having atomic radii compatible with the surface welding technique. At least one layer of compatible metals including gold and indium is plated to the base metal. To provide proper adhesion of indium to gold as exemplified by the illustrated embodiments, an interposed flash of copper or other suitable metal, such as silver, may be provided. To provide an easy manner of identifying the plated side of the material when the gold and indium layers are plated to a base metal of essentially the same color as indium, a gold flash is plated to the indium. Again, to increase the adhesion between the gold flash and the indium layer, if desirable, a copper flash or other compatible metal flash is interposed therebetween. If desirable, a flash of nickel may be interposed between the copper and gold flashes to prevent oxidation problems of the copper flash and undesirable diffusing of the indium. Also, the flash of nickel may be utilized instead of the copper flash, or may be utilized to add nickel in applications requiring such an addition.

This application is a continuation-in-part of U.S. patent application Serial No. 421,239, filed December 28, 1964, now abandoned, and assigned to the assignee of this application.

This invention relates generally to electronic transmission lines or materials for interconnecting electrical components, and more particularly to electronic transmission lines or materials adapted to surface welding and to a method for the fabrication thereof.

Electronic transmission lines which include a metallic coating which is fusible under surface welding operations to interconnect the line with a component lead, for example, are disclosed in U.S. Patent 3,150,288 assigned to the assignee of the present application. U.S. patent application, Serial No. 294,644, now abandoned, also assigned to the assignee of this application discloses and claims the surface welding process utilized in combination with electronic transmission lines fabricated from a plating solution containing specified proportions of the metals in solution.

This invention provides an improved electronic transmission line or material fabricated for example by utilizing a tank plating arrangement wherein the fusible coating applied on the base material can be maintained substantially constant as to thickness of the coating and as to the percentages of the fusible metals applied to the base material.

Briefly, this electronic transmission line or material comprises a strip, ribbon, or sheet coated on at least one side with fusible material for interconnecting component leads, etc., of an electronic module, header board, or printed circuit board, or for other such applications. The material to which the electronic transmission material is connected may or may not be coated with the fusible material. Also a number of different metals may be used as the base metal of the ribbon or sheet, or may be joined by the fusible material of the transmission line. The transmission line provides a simple yet effective mechanical and electrical connection which can be removed and reconnected many times without degradation of the quality of the mechanical or electrical interconnection.

Welding is employed in joining this electronic transmission line or sheet material to a component lead or the like. Therefore, the problems associated with soldering heretofore encountered in using other methods for interconnection are substantially eliminated. However, because in a large number of applications only one side of the transmission line ribbon is exposed and available to the welding electrodes, conventional welding means cannot be employed where serviceability is desired. Further, series welding of prior known material, which might at first appear to offer a solution, is unsatisfactory since it does not provide a joint which permits separation and rejoinder without adverse effect to the rewelded joint. Such a joint is, however, provided by the surface welding method disclosed and claimed in the above mentioned patent application, Serial No. 294,644, by the utilization of an alloy, plated to the base ribbon material, which not only provides a strong reliable joint separable as desired, but also assures that the joint may be accomplished repetitively on a servicing basis with available welding equipment.

Briefly, the surface welding technique described and claimed in the above mentioned patent application, in conjunction with the unique applied alloy, effects an interface bond between joined members. As pointed out above, at least one of the two members to be welded is coated with the alloy and the members are positioned face to face with the coated surface or surfaces in abutment. The two electrodes of the welding machine are positioned on one side and in contact with the exposed surface of one of the positioned members to be welded with a predetermined pressure applied thereto. Energy is then rapidly applied in predetermined quantity through the electrodes, as a result of which heat is rapidly applied to an area localized to the alloy disposed intermediate the members being joined. The metal of the alloy is therepon caused to diffuse, fuse and coact, creating a bond between the members which is strong in the shear direction but which may be broken in the peel mode and rewelded a number of times without harm to the rewelded joint.

It is thus seen that the electronic transmission material of this invention, when utilized with the surface welding technique, has very broad applications. For example, the alloy could be applied to the surface of a printed circuit and/or another member, such as a component lead surface welded to the printed circuit; or the alloy can be applied to a ribbon or strip of suitable metal and welded to another member.

Accordingly, it is an object of this invention to provide a laminar electronic transmission line or material and a method for making same.

A further object of the invention is to provide laminar constructed electronic transmission lines which, when welded to another member by the surface welding technique, provide a strong, reliable interconnection which may be broken and rewelded a number of times with little or no adverse effect upon the subsequent interconnection.

Another object of the invention is to provide a ribbon or sheet member with a fusible alloy on one surface thereof which can be joined to another member where but only one surface of the members to be joined is available for welding electrode contact.

Another object of the invention is to provide a method of applying fusible material to one surface of a member while maintaining constant thickness and desired proportions of the material applied.

Another object is to provide a method for applying to a suitable metal a coating of at least indium and gold wherein the percentage of indium by weight to the percentage of gold by weight is in a predetermined range and wherein the coating has a predetermined thickness.

Another object is to provide electronic transmission material which provides in the as-welded condition of the material with any compatible metal, a percentage of indium by weight to gold by weight in a predetermined range and a percentage of nickel by weight to gold by weight in predetermined range.

Other objects of the invention, not specifically set forth, will become readily apparent from the following description and accompanying drawings wherein.

Figure 1:
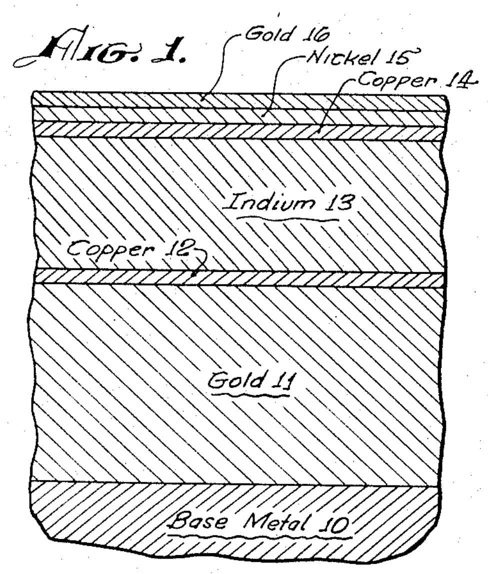
FIG. 1 is a cross-sectional view of an embodiment of the electronic transmission line made in accordance with the invention.

While, as pointed out above, various metals compatible with the surface welding technique may be utilized as the base metal, the description of the invention will be directed primarily to nickel as the base metal, for illustrative purposes only, and in no way should such description be considered as limiting the invention to a specific base metal.

The electronic transmission material or line of this invention in the as-plated condition constitutes the base metal, such as nickel, and a laminated coating or alloy plated on one side thereof which is primarily constituted of indium and gold. The amount of each of the plated alloy or coating components are maintained within certain predetermined ranges.

While the amount of indium by weight with respect to the amount of gold by weight in the as-plated condition has proven satisfactory over the range of about 3% to 20%, it is preferred to maintain the indium percentage by weight to the gold in the range of about 7% to 17%. The plated coating or alloy thickness may be in the range of 150 to 500 microinches, however, a thickness of 250–50 (200–300) microinches over the entire one surface of the base metal is preferable. Plating in excess of 300 microinches in thickness will weld satisfactorily, however, this is more material than is required and thus uneconomical. On the other hand, with plating below 200 microinches in thickness, there is not adequate material to assure a good bond and, therefore, welding consistency becomes poor. The thickness of the plated alloy or coating is largely dependent upon mechanical factors such as the surface smoothness and on the percentages of indium to gold desired in the as-plated condition and the thickness of the flashes or films of additional material, when utilized. In applications where both surfaces to be welded are coated with the material of the invention, the thickness of each coating may be reduced so that the total thickness of both surfaces is in the range specified.

In the as-welded condition the alloy or coating is composed primarily of nickel and gold in addition to the indium, for example, with the nickel being introduced by mutual diffusion. The interface bond of the electronic transmission material or line, when utilized with nickel is comprised primarily of nickel, gold, and indium. This ternary alloy may be considered to be predominantly composed of gold and nickel with the addition of indium to serve as a solid-state wetting or diffusant agent in addition to a hardening agent. When the transmission material of this invention utilizes nickel, for example, as the base metal, is surface welded to copper, for example, an interface quaternary alloy is created, which again exhibits shear properties which are stronger than the base material and will therefore usually pull off the base copper metal member when removed.

Although good surface welds between the gold and nickel systems disclosed in the above cited patent are within the range of five and sixty percent nickel by weight with respect to the gold, strong joints between two copper members may be achieved by this invention throughout a similar by weight range of gold-nickel plating. However, the low percentage of nickel is at least fifteen percent by weight in order to achieve high strength, i.e. approximately fifteen to sixty percent by weight nickel with respect to gold. The indium serves as a hardening and an embrittling agent and a diffusant to the gold-nickel system.

Figure 2:
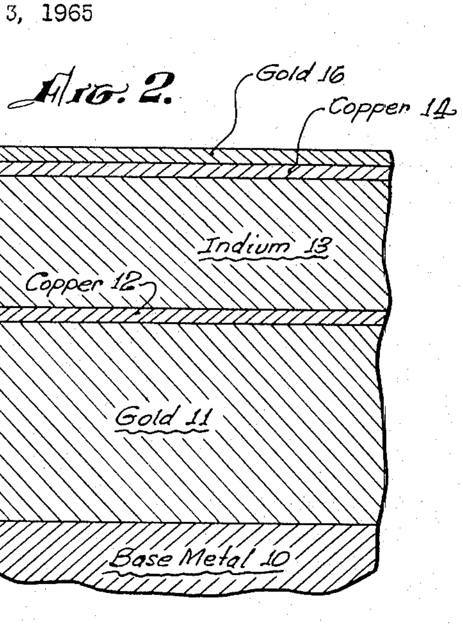
FIG. 2 is a cross-sectional view of another embodiment of the transmission line made in accordance with the invention.
Figure 3:
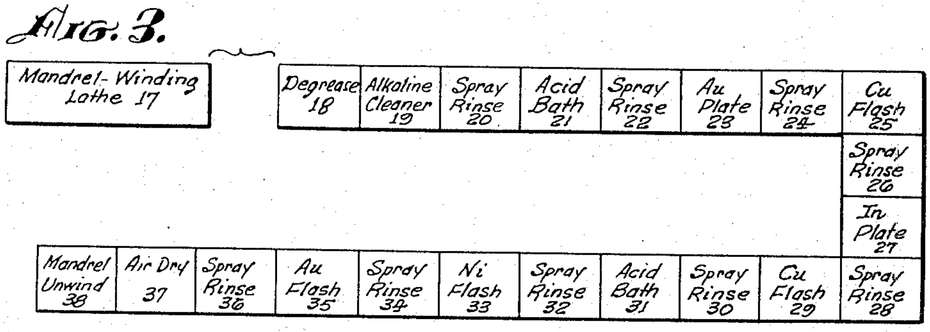
FIG. 3 is a diagrammatic illustration of a method for fabricating the transmission line.

In the exemplary tank plating process diagrammatically illustrated in FIG. 3 and described herein the base metal such as nickel ribbon is wound on a mandrel so that only one surface or face is exposed; the edges are exposed due to slight curvature of the ribbon edges; the exposed surface or face of the ribbon is prepared for plating by both mechanical and chemical cleaning, if necessary; then a layer of gold is electroplated to the proper thickness range in the vicinity of 150–230 microinches; this is followed by the second primary plating material, indium, which is plated to an approximate thickness range of 20–100 microinches, depending on the percentages of indium and gold. Any combination of these ranges may be utilized. To increase adhesion between the indium and gold, a film or flash of copper or other suitable material may be electroplated to the gold prior to the plating of the indium thereto depending on the adhesion characteristics of the plating baths; then a film or flash of gold is plated onto the layer of indium with interposed films or flashes of copper and/or nickel, if desired as illustrated in FIGS. 1 and 2. After applying the final plating, the ribbon is dried and then unwound from the mandrel onto a spool for later use. It is generally considered advisable in the plating process to follow each chemical bath, be it either etchant or plating, by one or two rinses, to be sure that one solution does not drag into the next tank and contaminate it. The mandrels are so constructed and placed in the tanks as to give reasonably uniform current density throughout the plating solution, as the current flows from the anode to the mandrel which serves as the cathode, thus providing a uniform plating throughout the length of the mandrel.

Referring now to the drawings, FIGS. 1 and 2 show representative layers of embodiments of the laminar constructed electronic transmission material of the invention. The FIG. 1 embodiment comprises a base metal 10 such as nickel, a layer 11 of gold having a thickness range of approximately 150–230 microinches, a film 12 of copper having a thickness of 10–20 microinches, a layer 13 of indium having a thickness range of approximately 20–100 microinches, and films 14, 15 and 16 of copper, nickel and gold, respectively, each having a thickness of 10–20 microinches. A pointed out above, the specific thickness of the layers 11 and 13 is dependent on the percentage by weight of indium to gold desired in the as-plated condition of the material. By way of example, with a 15% by weight ratio of indium to gold, the approximate thickness of the respective layers is 80 and 170 microinches.

The FIG. 2 embodiment is essentially the same as that illustrated in FIG. 1 except the film 15 of nickel between the copper and gold films 14 and 16, respectively, has been omitted. The nickel film 15, although its presence is not essential, provides the following advantages: (1) prevents the possibility of indium diffusing through the next film (gold); (2) prevents oxidation problems since copper is highly corrosive under certain conditions; (3) protects the soft indium layer; and (4) improves appearance of the transmission material.

Although not shown, the copper film 14 may be omitted in the FIG. 1 embodiment. Also, in each of the FIGS. 1 and 2 embodiments, the copper films may be replaced with metals such as silver which is compatible with indium and gold.

The following is a sequence of steps for the preparation and plating of a base metal in ribbon form to produce the electronic transmission material, illustrated in FIG. 1. Also set forth are the reasons for and results of each step. FIG. 3 diagrammatically illustrates the sequence of steps utilized in producing the FIG. 1 material. However, if desired, certain of the following steps may be omitted or modified. The specific plating sequence described produces a percentage ratio of 15/85 indium to gold by weight.

*Preplating preparation:*

(1) Close wind the base metal ribbon 10 to be plated (such as grade "200" annealed nickel) on a mandrel by mechanism such as a mandrel winding lathe indicated at 17 (see FIG. 3) such that only substantially one face or surface of the ribbon is exposed. This is to (1) hold the ribbon during the plating operation, (2) provide a means to plate large amounts or ribbon at one time due to the high ribbon density on the mandrel, and (3) protect the surface of the ribbon facing the mandrel against plating. The ribbon is thus easily handled and permits efficient use of plating personnel. Due to the slight curvature of the ribbon edges, a portion of the edges will be exposed.

(2) At degrease station 18, the exposed face of the ribbon on the mandrel is wiped with MEK (methylethylketone) which is an organic cleaner and solvent which effectively removes grease and oils from surfaces to be plated. This results in a uniformly plated surface due to the removal of surface contamination. Hysol-PC-12-006 may be applied to the mandrel in areas where plating is not desired.

(3) Immerse the ribbon wound mandrel in alkaline solution tank 19 for 5 minutes at 160° to 170° F. to further clean the ribbon in areas where the MEK may not have reached in step 2 and to remove contaminants which may be present that are not soluble in MEK. Due to the ribbon being cleaned of all possible contamination, a uniform electroplate will result.

(4) Rinse in cold running water at 20 for 1 to 2 minutes to remove the alkaline cleaner from the mandrel and the ribbon for preventing contamination of the next bath.

(5) Pickle (activate the ribbon) in hydrochloric acid solution 21 composed of 50% HCl for 1 to 3 minutes at room temperature to scale and oxidation from the to-be-plated surface or face to insure a more adherent surface.

(6) Rinse in cold running water at 22 for 1 to 2 minutes to remove the pickle solution from the mandrel and ribbon to prevent contamination of the gold tank solution.

*Plating:*

(1) Electroplate the ribbon 10 prepared in the manner set forth in steps 1-6 above, in an acid gold solution in tank 23 using cathode agitation and at 2.5 amps./ft.$^2$ for 28 minutes with the solution at 130° to 140° F. The thickness of the gold plated layer 11 is approximately 170 microinches and provides the gold for diffusion of the gold-nickel system that gives the bond its strength in the as-welded condition.

(2) Rinse in cold water at 24 for 1 to 2 minutes to remove the gold plating solution from the ribbon wound mandrel (specimen or workpiece) thereby preventing contamination of the next solution. The gold thus washed off into the rinse tank 24 can then be reclaimed.

(3) Flash plate the gold plated ribbon in a cyanide copper solution in tank 25 at 6 volts for 10 to 20 seconds with the solution at 130° to 140° F. This provides a very thin film 12 (10-20 microinches) of copper over the gold plate to aid the adhesion of the indium plate that follows.

(4) Rinse in cold water at 26 for 1 to 2 minutes to remove all the cyanide copper solution from the workpiece thereby preventing contamination of the next solution.

(5) Electroplate the copper plated ribbon in an indium cyanide solution in tank 27 using cathode agitation at 15 amps./ft.$^2$ for about 3 minutes with the solution at room temperature. The thickness of the indium plated layer 13 is approximately 80 microinches and serves to strengthen the weld in the lower weld energy range. This effectively lengthens the plateau of the weld profile and ultimately provides a welded joint with the desired properties of high shear strength and low peel strength below the fusion energy range.

(6) Rinse in cold water at 28 for 1 to 2 minutes to remove the indium plating solution from the workpiece and thereby prevent contamination of the next solution.

(7) Flash plate the indium plated ribbon in a cyanide copper solution in tank 29 at 6 volts for 20 seconds with the solution at 130° to 140° F. This provides a very thin film 14 (10-20 microinches) of copper over the indium plate, thus providing a base for and aiding in the application of a uniform good adhering nickel plate which follows.

(8) Rinse in cold water at 30 for 1 to 2 minutes to remove the copper plating solution from the workpiece to prevent contamination of the next plating solution.

(9) Dip the copper plated ribbon in 10% sulphuric acid solution in tank 31 for 5 to 10 seconds with the solution at room temperature. This step is required because copper is subject to rapid oxidation and it is therefore necessary to remove any copper oxides which may have formed. The removal of the oxides insures good adhesion for the following nickel plate.

(10) Rinse in cold water at 32 for 1 to 2 minutes to remove all traces of the sulphuric acid solution from the mandrel and ribbon and thus prevent contamination of the following solution.

(11) Flash plate the copper plated ribbon in a nickel solution in tank 33 at 30 amps./ft.$^2$ for 1 minute with the solution at 120° to 140° F. to provide a very thin nickel film 15 (10-20 microinches) of nickel over the copper film. A sound bonding system is thus obtained since the chances of losing the indium if placed in contact with other materials at elevated temperature and the possibility of encountering copper oxidation and "bleed through" problems are lessened. Additionally, the nickel film serves to protect the soft indium layer.

(12) Rinse in cold water at 34 for 1 to 2 minutes to remove all the nickel plating from the workpiece to prevent contamination of the following gold solution.

(13) Flash plate the nickel plated ribbon in an acid gold solution in tank 35 at 2.5 amps./ft.$^2$ for 1 minute with the solution at 130° F. to 140° F. A very thin gold film 16 of approximately 10-20 microinches is thus provided which serves for identifying the plated side of the ribbon and gives added protection to the very soft indium film.

(14) Rinse in cold water at 36 for 1 to 2 minutes to remove the gold plating solution from the workpiece, whereby the gold in the plating solution washed off the workpiece can be reclaimed and unnecessary loss of the precious metal prevented.

(15) Dry the mandrel and plated ribbon with an air blast at 37, thereby providing a shiny, streak free gold plate.

(16) Unwind the plated ribbon at 38 from the mandrel onto a spool or retainer mechanism for later use as desired.

The sequence of steps for the preparation and plating of a base metal to produce the electronic transmission material illustrated in FIG. 2 may be the same as set forth above with respect to the description of manufacturing the FIG. 1 embodiment, except that steps 9 through 12 are omitted. Again the specific steps set forth may be modified and some steps omitted if desirable. However, higher quality transmission material is better assured under production conditions when the above steps are retained.

Satisfactory results for plating, adhesion, ratio of constituents, thickness and weld characteristics of the electronic transmission material have been obtained when made in accordance with this invention. Since the makeup and control of the solutions utilized in the above described method have a direct relationship to the material produced thereby, an example of the makeup of the solutions which can be used in the above described method is as follows:

(1) Alkaline Cleaner.—6 oz. of Diversey #808 cleaner per gallon of tap water. The constituents of the cleaner are proprietary to Diversey Western Co., South Gate, California, and thus not available.

(2) Hydrochloric Acid Pickle Solution.—50% by volume of 37% hydrochloric acid and 50% by volume of distilled or deionized water.

(3) Acid Gold Plating Solution.—One pound of Orotemp Additive #1 made by Technic Inc. and 1 troy oz. of Orotemp 24–24 kt. neutral gold (salts) also made by Technic Inc. per gallon prepared as follows:

A. Fill the container or tank to two-thirds full with distilled or deionized water and heat to 140° F.

B. Add the Orotemp additive #1 and stir until completely dissolved.

C. Add the Orotemp 24 kt. gold salts and stir until completely dissolved.

D. Add distilled or deionized water to bring up to operating level and mix thoroughly.

E. Adjust pH to 5.0–7.0 if necessary, with reagent grade phosphoric acid or potassium hydroxide.

(a) To reduce the pH of the solution 0.1 unit, add 300 ml. reagent grade phosphoric acid per 100 gallons of working solution.

(b) To raise the pH of the solution 0.1 unit, add 9 oz. of reagent grade potassium hydroxide per 100 gallons of solution.

(4) Cyanide Copper Plating Solution.—Mix 9.2 oz./gal. of sodium cyanide, 7.5 oz./gal. of copper cyanide, 7.5 oz./gal. of rochelle salts, and 4.0 oz./gal. of sodium carbonate with deionized water. After solution makeup, adjust the pH to 12.5 by adding sodium hydroxide. Maintain free sodium cyanide at 1.0 to 1.5 oz./gal.

(5) Indium Cyanide Plate Solution.—Use Indium Plating Solution produced by Technic Inc. with no dilution. Concentration of this solution is with 4 oz./gallon of Indium and 12 oz./gal. of free cyanide. Again the constituents of the trade name items are not available.

(6) Sulphuric Acid Dip Solution.—Mix 14.0 fl. oz./gal. of sulphuric acid— 66° Bé. with tap water.

(7) Nickel Plating Solution.—In accordance with the instructions of HVWM Co. instruction manual on Levelume 220 Bath, fifth issue, dated February 1961, mix 40.0 oz./gal. of nickel sulfate, 7.0 oz./gal. of nickel chloride, 6.0 oz./gal. of boric acid, 6.0 fl. oz./gal. of NL–21 brightner, 0.25 fl. oz./gal. of NL–22 brightner, 0.50 fl. oz./gal. of NL–1–J concentrate, and 0.16 fl. oz./gal. of Anti-pit #7 with distilled or deionized water as required to make the volume of solution desired.

The control and operating ranges of the solutions in order to maintain them properly are as follows:

(1) Alkaline Cleaner Solution.—By Chemical analysis once per week the Diversey #808 is to be maintained in the range between 5.0 to 7.0 oz./gal.

(2) Hydrochloric Acid Pickle Solution.—By a weekly chemical analysis, maintain the hydrochloric acid in the range of 14% to 18% by weight.

(3) Acid Gold Plating Solution.—Determine daily the pH and the specific gravity; determine by weekly chemical analysis the gold content; add ¼ troy oz. 24 kt. gold salts for each ampere hour; and maintain the following operating ranges: pH (electrometric) at 5.0–7.0, pH (paper) at 5.3–7.3, specific gravity at 1.08–1.15 and 11°–16° Baumé, temperature at 130°–160° F., current density at 1–10 amps./ft.$^2$, time to plate 0.0001 inch with pH of 6.2 at 8 minutes at 5 amps./ft.$^2$, and metal content (by analysis) at 0.6–1.20 troy ounces.

(4) Cyanide Copper Plating Solution.—By chemical analysis once per week maintain the following operating ranges: copper at 4.0 to 6.0 oz./gal., free sodium cyanide at 1.0 to 1.5 oz./gal., sodium carbonate at 2.0 to 10.0 oz./gal., and the rochelle salts at 5.0 to 9.0 oz./gal.

(5) Indium Cyanide Plating Solution.—Maintain the indium content within a 10 percent range, the free cyanide in the range of 11–13 oz./gal. by the addition of potassium cyanide, the hydroxide in the range of 2–10 oz./gal.; add 15–17 ml. of indium concentrate per each ampere hour of plating, and maintain the following operating ranges: temperature at 75–95° F., current density at 15–20 amps./ft.$^2$, and time to plate 0.0001 inch at 7.5 minutes at 15 amps./ft.$^2$.

(6) Sulphuric Acid Dip Solution.—By weekly chemical analysis maintain the operating range of the sulphuric acid at 23% to 27% by weight.

(7) Nickel Plating Solution.—By chemical analysis weekly, maintain the following operating ranges; metallic nickel at 8.5 to 11.5 oz./gal., nickel chloride at 4.0 to 6.0 oz./gal., pH at 3.5 to 4.2 boric acid at 6.0 to 8.0 oz./gal., and SN–1 addition agent at 0.5 to 2.0 oz./gal.

Figure 4:
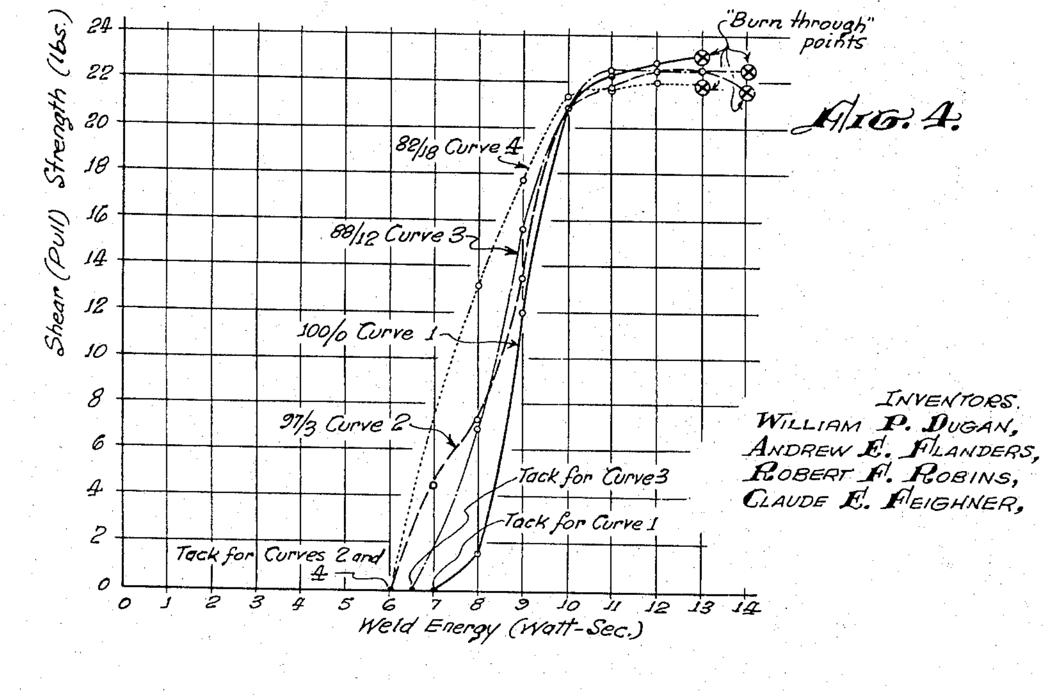
FIG. 4 is a graph illustrating characteristics of the transmission line as-plated with various percentages of gold and indium.

As pointed out above, one of the novel features of the electronic transmission material is its pull or shear strength combined with its inherent capability of being welded to an element, broken or peeled from the element at the welded point, and rewelded at the same point. It has been shown that this sequence can be repeated a relatively large number of times without adverse effects as to the strength of the weld or the electrical qualities thereof. FIG. 4 and the following charts illustrate, by way of example, the following:

(1) Tack Point.—Point at which the weld begins to tack, which has been shown to be of a weld energy between 5.5 to 7.5 watt seconds for a particular weld equipment setup.

(2) Shear (Pull) Strength.—The number of pounds pressure required to shear or break the material. For example, with a power supply at 1.5 times the average tack point energy, the welds should preferably test to destruction at a shear strength of 10 lbs. or above, or with a power supply at 11 watt seconds, each weld should test to destruction at a shear strength of 14 lbs. or above.

(3) Peel Strength.—The number of pounds pressure required to peel the transmission material away from the element to which it was welded. For example, with the power supply set at 11 watt seconds, each weld should preferably peel at between 2.5 to 6 lbs.

(4) No Peel Point.—The point at which no peel occurs; i.e. a fusion weld is obtained. Thus with the power supply at 14 watt seconds, for example, any of the material which will not peel from the weld is considered unsatisfactory for maximum effectiveness.

While the description is directed to surface welding techniques, the same weld characteristics of the material can be produced with the cross (resistance) welding technique.

FIG. 4 graphically illustrates the shear or pull strength qualities of examples of electronic transmission material utilizing various weld energy settings and based on the following information. Each of the welds were made with a weld energy pulse of 9 milliseconds total duration.

Curve No. 1: Composed of a layer of 100% gold plated on a nickel base metal. It was determined that the weld did not peel with weld energy above 9 watt sec.

| Energy (watt-sec.): | Av. shear strength (lbs.) |
|---|---|
| 7 | Tack point |
| 8 | 1.7 |
| 9 | 12 |
| 10 | 20.8 |
| 11 | 22.2 |
| 12 | 22.8 |
| 13 | 22.8 |
| 14 | 23.1 |
| 15 | Burn through |

Curve No. 2: Composed of electronic transmission material with nickel as the base metal and with 97% gold by weight to 3% indium by weight in the as-plated condition. A satisfactory peel strength of 3.5 lbs. was obtained at 11 watt sec. weld energy.

| Energy (watt-sec.): | Av. shear strength (lbs.) |
|---|---|
| 6 | Tack point |
| 7 | 4.3 |
| 8 | 7.2 |
| 9 | 13.6 |
| 10 | 20.8 |
| 11 | 21.8 |
| 12 | 22.5 |
| 13 | 22.5 |
| 14 | 21.6 |
| 15 | Burn through |

Curve No. 3: Composed of electronic transmission material with nickel as the base metal and with 88% gold by weight to 12 indium by weight in the as-plated condition. A peel strength of 2.8 lbs. was obtained at 11 watt sec. weld energy which is in the satisfactory range.

| Energy (watt-sec.): | Av. shear strength (lbs.) |
|---|---|
| 6.5 | Tack point |
| 8.0 | 6.7 |
| 9.0 | 15.5 |
| 10 | 20.8 |
| 11 | 22.5 |
| 12 | 22.5 |
| 13 | 22.5 |
| 14 | 22.5 |
| 15 | Burn through |

Curve No. 4: Composed of electronic transmission material with nickel as the base metal and with 82% gold by weight to 18% indium by weight in the as-plated condition. Peel strength of 3.1 lbs. at 11 watt sec. weld energy was determined.

| Energy (watt-sec.): | Av. shear strength (lbs.) |
|---|---|
| 6 | Tack point |
| 8 | 13.1 |
| 9 | 17.7 |
| 10 | 21.3 |
| 11 | 21.7 |
| 12 | 21.9 |
| 13 | 21.9 |
| 14 | Burn through |

As more clearly seen on the FIG. 4 graph, it is desirable to eliminate the backward bend in lower portion of the curves illustrated in Curves No. 1 and 2, thus indicating the advantages of the utilization of the range of about 3%–20% indium by weight to gold by weight as set forth above. Curves 3 and 4 show the desirable qualities of the larger percentage of indium to gold with the lower portion of the curves starting to bend in the direction opposite the bends in Curves No. 1 and 2. However, material made with the percentages illustrated in Curve No. 2 produces satisfactory weld characteristics. Therefore, as illustrated by the FIG. 4 graph, it is preferable to utilize the percentages of indium to gold that will produce a shear strength-weld energy curve that will produce a substantially straight line from the tack point to the elbow of the plateau of the curves. By the utilization of the curves of FIG. 4 for example, it can be determined which weld energy setting for the specific welding equipment being utilized produces the desired shear strength of type of electronic transmission material to be welded. It should be noted that all energy settings vary due to the variations in the power supply and the internal and external conditions of the welding equipment. As shown here and described above, it has been determined that with transmission material having about 7;18% indium by weight to gold by weight in the as-plated condition the weld energy setting should be approximately 11 watt seconds to produce a weld having these desirable characteristics with a specific type of welding equipment. Different type of welders have different internal characteristics and thus produce variations in the weld energy settings.

It has thus been shown that this invention comprises an electronic transmission material having in the as-plated condition a specific range of indium by weight to gold by weight which produces a weld which can be peeled off and rewelded a relatively large number of times without adverse effects to the characteristics of the weld. While specific methods for producing specific embodiments of the electronic transmission material have been illustrated and described, the manner of making transmission material having the desirable as-plated percentages of indium and nickel to gold by weight is not limited to the specifics described and illustrated. While it is desirable to prevent the sides of the base material from being plated, overlap on the sides is permissible. Also, if desired, all surfaces of the ribbon may be plated.

While the invention has been described utilizing multiple plating solutions in separate tanks and by mandrel winding concept, the material may be made by continuous movement through the plating steps or the proper solutions may be combined into a single tank and thus produce a composite coating on the base metal.

In addition to the uses of the material of the invention as specified above, the peelable feature of the material gives many applications in the mechanical field such as, for example, a means of opening containers or providing a repairable container opening. Also, the electronic transmission material of the invention is compatible with cross (resistance) welding techniques and should not be considered as limited to surface welding applications.

Although particular embodiments of the material and methods for making the same have been illustrated and described, modifications and changes will become apparent to those skilled in the art, and it is intended to cover, in the appended claims, all such modifications and changes as come within the true scope and spirit of this invention.

What we claim is:

1. An electronic transmission ribbon comprising a base of nickel and layers of gold, copper, indium, copper and gold plated in sequence on at least one surface of the nickel.

2. The electronic transmission ribbon defined in claim 1 additionally including a layer of nickel interposed between the layer of copper and the last mentioned gold layer.

3. An electronic transmission material comprising a base metal of nickel and a layer of gold, a layer of copper, and a layer of indium plated sequentially on at least one surface of the nickel, the indium being in the range of about 3 to 20 percent by weight of the gold by weight.

4. The electronic transmission material defined in claim 3 including at least one additional layer plated to the layer of indium for identification purposes.

5. A method of producing electronic transmission material comprising the steps of: preparing a base metal for plating, plating a layer of gold onto the base metal, plating a film of copper onto the gold plate, and plating a layer of indium onto the copper plate, the plated indium by weight being about 3 to 20 percent of the plated gold by weight.

6. A tank plating method for producing laminar conductive material comprising the steps of: winding the base metal on a mandrel so that essentially only one surface thereof is exposed, preparing the exposed surface of the base metal, electroplating a layer of gold on the exposed surface, rinsing the plated surface and the mandrel, electroplating a film of copper on the gold plate, rinsing the plated surface and the mandrel, plating a layer of indium on the copper plate, rinsing the plated surface and mandrel, then drying and unwinding the plated material.

7. The method defined in claim 6 wherein the base metal is nickel.

8. The tank plating method defined in claim 6, additionally including the steps of electroplating a film of gold over the layer of indium, and rinsing the plated surface and mandrel prior to drying and unwinding the plated material.

9. The tank plating method defined in claim 8, additionally including the steps of electroplating a film of copper over the layer of indium, rinsing the plated surface and mandrel, applying an appropriate acid to the copper plated surface, and rinsing at least the copper plated surface prior to electroplating the film of gold.

10. The tank plating method defined in claim 9, additionally including the steps of electroplating a film of nickel over the last mentioned copper film and rinsing the plated surface and mandrel prior to electroplating the film of gold.

11. The method defined in claim 10, wherein the composite thickness of the metals plated onto the base metal is in the range between about 200 and 300 microinches.

12. The method defined in claim 11, wherein the base metal is nickel.

13. A laminar conductive material comprising a base metal and a plurality of layers of metals coated on at least one surface of said base metal, said plurality of layers of metal being composed of a layer of gold plated on the base metal, a layer of adhesion improving metal selected from the group consisting of copper and silver plated on the layer of gold, and a layer of indium plated on the layer of adhesion improving metal.

14. The laminar conductive material defined in claim 13, additionally including a layer of copper plated on said layer of indium.

15. The laminar conductive material defined in claim 14, additionally including a layer of gold plated on said layer of copper.

16. The laminar conductive material defined in claim 15, additionally including a layer of nickel interposed between said layer of copper and said last mentioned layer of gold.

17. The laminar conductive material defined in claim 13, wherein said base metal is selected from the group consisting of nickel, copper, silver, chromium, and nickel-iron alloys.

18. A laminar conductive material comprising a base metal and a plurality of layers of metals coated in sequence on at least one surface of said base metal, said base metal being selected from the group consisting of nickel, copper, silver, chromium, and nickel-iron alloys, said layers of metal being selected from the group consisting of gold, indium, silver, copper, and nickel.

References Cited

UNITED STATES PATENTS

| | | | |
|---|---|---|---|
| 2,417,967 | 3/1947 | Booe | 29—199 |
| 2,438,967 | 4/1948 | Ellsworth | 29—199 |
| 2,925,643 | 2/1960 | Haayman | 204—40 X |
| 3,000,085 | 9/1961 | Green | 29—199 X |
| 3,184,824 | 5/1965 | Fairbairn | 204—15 X |
| 3,206,824 | 9/1965 | Allen | 29—195 X |
| 3,259,556 | 7/1966 | De Nault | 204—15 X |

HYLAND BIZOT, *Primary Examiner.*